United States Patent [19]

Moyer

[11] Patent Number: 4,968,095

[45] Date of Patent: Nov. 6, 1990

[54] SEAT BACK ARM RECLINER

[75] Inventor: George A. Moyer, Union, Mich.

[73] Assignee: Moyers, Inc., Elkhart, Ind.

[21] Appl. No.: 388,715

[22] Filed: Aug. 1, 1989

Related U.S. Application Data

[63] Continuation of Ser. No. 123,808, Nov. 23, 1987.

[51] Int. Cl.$^5$ .............................................. A47C 7/54
[52] U.S. Cl. .................................... 297/417; 297/416; 297/421
[58] Field of Search ............... 297/416, 417, 411, 421, 297/375, 323, 115, 113

[56] References Cited

U.S. PATENT DOCUMENTS

| | | | |
|---|---|---|---|
| 472,372 | 4/1892 | Leonard | 297/323 |
| 1,502,001 | 7/1924 | Koenigkramer | 297/375 |
| 1,571,509 | 2/1926 | Connolly | 297/375 |
| 2,661,227 | 12/1953 | Murphy | 297/416 X |
| 2,662,585 | 12/1953 | Ozenne | 297/375 |
| 3,357,740 | 12/1967 | Vaughn et al. | 297/416 |
| 3,586,374 | 6/1971 | Laessker | 297/417 |
| 3,883,175 | 5/1975 | Rodaway | 297/416 |
| 4,067,613 | 1/1978 | Pesiri | 297/416 |
| 4,118,069 | 10/1978 | Hunter | 297/416 |
| 4,141,586 | 2/1979 | Goldner et al. | 297/417 |
| 4,159,145 | 6/1979 | Quakenbush | 297/417 |
| 4,400,033 | 8/1983 | Pietsch | 297/115 |

Primary Examiner—Peter R. Brown
Attorney, Agent, or Firm—Barnes & Thornburg

[57] ABSTRACT

A reclinable vehicle seat is provided having an arm rest which is connected to the seat at a single location on the side of the seat back. The arm rest is connected to the seat back by a retainer that pivots with respect to the seat back to automatically maintain a predetermined orientation of the arm rest as the seat back is reclined relative to the seat bottom. The arm rest is pivotable with respect to the retainer to positions higher than the predetermined orientation to facilitate access to the seat. The retainer is preferably fully enclosed within the seat. The arm rest is separately upholstered from the rest of the seat and attaches to the retainer after upholstering such that the seat can be fully upholstered. Two arm rests can be simultaneously adjusted as the seat back is reclined by using two separate retainers or an extension attached to a single retainer. The retainer maintains the predetermined orientation of the arm rest through a movable connection to the seat bottom.

14 Claims, 3 Drawing Sheets

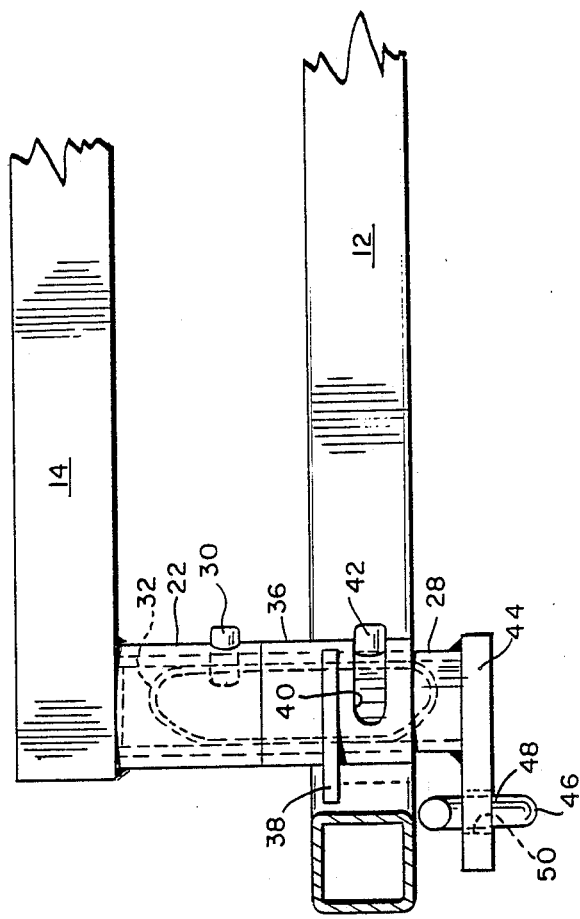

SEAT BACK ARM RECLINER

This application is a continuation of application Ser. No. 07/123,808, filed Nov. 23, 1987.

The present invention relates generally to seats and chairs and, more particularly, to assembly arrangements for upholstered seats mounted in vehicles. This invention is especially useful for seats in automotive vans, buses, airplanes, motor homes and non-vehicular applications where reclining seats are employed and/or increased accessibility to seats is desirable.

With reclinable seats, it has been found to be advantageous to have the arm rests remain in a predetermined orientation, typically parallel with the seat bottom, when the seat back is reclined with respect to the seat bottom. Previously, it has been suggested to accomplish this goal by attaching the arm rests to the seat independently of the seat back. However, in such arrangements an undesirable gap can arise between the arm rests and the seat back as the seat back is reclined. Also, such arm rests typically remain at a fixed heights no matter what the inclination of the seat back. This orientation can be especially uncomfortable, or render the arm rests useless, as the seat back is more fully inclined.

Alternatively, it has been suggested to mount each arm rest to the seat by a parallelogram linkage having multiple pivot points. For example, one end of each arm rest would be pivotably attached to a side of the seat back; the seat back would be pivotably attached at its lower end to the seat bottom; the other end of each arm rest would be pivotably attached to one end of a linkage bar; and the other end of the linkage bar would be pivotably attached to the seat bottom. As the seat back is reclined, such arm rests would automatically move rearward and downward with the seat back, but would maintain their predetermined horizontal orientation with respect to the seat bottom.

However, such parallelogram arrangements typically have several significant disadvantages, particularly when employed with fully upholstered seats. For example, in upholstering seats it is desirable to have as few folds or internal corners as possible so as to minimize the time and expense involved. Parallelogram arrangements for arm rests create additional folds or internal corners between the arm rests and both the seat back and seat bottom. Further, because it is necessary to allow for movement of the linkage within the upholstery when the seat back is reclined, it is difficult to avoid creating unsightly and awkward bulges, flaps or folds of excess material. Partial upholstery of the arm seats, on the other hand, typically leaves working elements of the linkage exposed to view and/or inadvertent contact with persons using those seats.

In addition, such parallelogram arrangements typically preclude movement of the arm rests (and their support mechanisms) toward the seat back independently of seat back movement. However, it has been found to be especially desirable to allow for such motion, particularly with vehicle seats. For example, if the arm rests are connected to the seat by a single pivot to a side of the seat back, the arm rests may be rotatable upward to be generally parallel with the seat back. That arrangement provides greater accessibility to the seat by simplifying side entry and egress within the limited interior of certain vehicles.

Unfortunately, arm rest mounting arrangements that permit such accessibility to the seat typically do not permit the arm rests to automatically remain in a predetermined orientation with respect to the seat bottom as the seat back is reclined. Some arrangements do permit the arm rests to be adjusted separately from the seat back to a few discrete positions to approximate the predetermined orientation, but those arrangements typically lack durability and simplicity of operation. Also, it has been found to be difficult to create such an arrangement wherein both arm rests are adjusted simultaneously, especially if only one arm rest needs to be able to be raised for accessibility to the seat.

Further, arm rests mounting arrangements that permit such accessibility to the seat typically require complete installation of the mounting arrangement and the arm rests prior to upholstering. Again, this can increase the cost of upholstering since additional folds or corners are created at the juncture of the arm rest and the seat back. On the other hand, partial upholstering around the mounting arrangement can leave exposed portions which are unsightly, hazardous, and/or potential sources of clothing stains to seat occupants.

It has also been found to be desirable to provide compact seat constructions having minimal weight and dimensions. This is especially true where such seats are employed in conversion vans and other vehicles with relatively limited interior spaces. At the same time, it is important to maximize occupant comfort and safety. Further, since vehicular seats are typically subject to significant vibration and other "road stresses," it is especially important that arm rest mounting arrangements be durable and operationally reliable for long periods of use.

Accordingly, it is an object of the present invention to provide an improved seat arrangement.

Another object is the provision of a reclinable seat wherein the arm rests are automatically adjusted to maintain a predetermined orientation as the seat back is reclined.

A further object is to provide a seat arrangement wherein the arm rests are movable so as to permit increased accessibility to the seat.

Yet another object is the provision of a seat arrangement which is readily upholstered in full without limiting arm rest adjustment.

Still another object is to provide a simplified, compact and reliable arm rest mounting arrangement for use with a vehicular seat.

A still further object is the provision of a reclinable seat having a readily adjustable arrangement to establish a desired orientation of the arm rests which is automatically maintained throughout the range of seat back positions.

Yet still another object is to provide a reclinable vehicle seat wherein both arm rests are simultaneously adjusted as the seat back is reclined.

These and other objects of the present invention are attained by the provision of a reclinable vehicle seat having an arm rest which is connected to the seat at a single location on the side of the seat back. The arm rest is connected to the seat back by a retainer that pivots with respect to the seat back to automatically maintain a predetermined orientation of the arm rest as the seat back is reclined relative to the seat bottom. The arm rest is pivotable with respect to the retainer to positions higher than the predetermined orientation to facilitate access to the seat. The retainer is preferably fully enclosed within the seat. The arm rest is separately upholstered from the rest of the seat and attaches to the retainer after upholstering such that the seat can be fully upholstered. Two arm rests can be simultaneously adjusted as the seat back is reclined by using two separate retainers or an extension attached to a single retainer. The retainer maintains the predetermined orientation of the arm rest through a movable connection to the seat bottom.

Other objects, advantages and novel features of the present invention will now become readily apparent upon consideration of the following description of preferred embodiments in conjunction with the drawings.

BRIEF DESCRIPTIONS OF THE DRAWINGS

FIG. 4 is a schematic, partial top view of the left arm rest mounting arrangement shown in FIG. 1 in an inclined position.

DETAILED DESCRIPTION OF PREFERRED EMBODIMENTS

Figure 1:
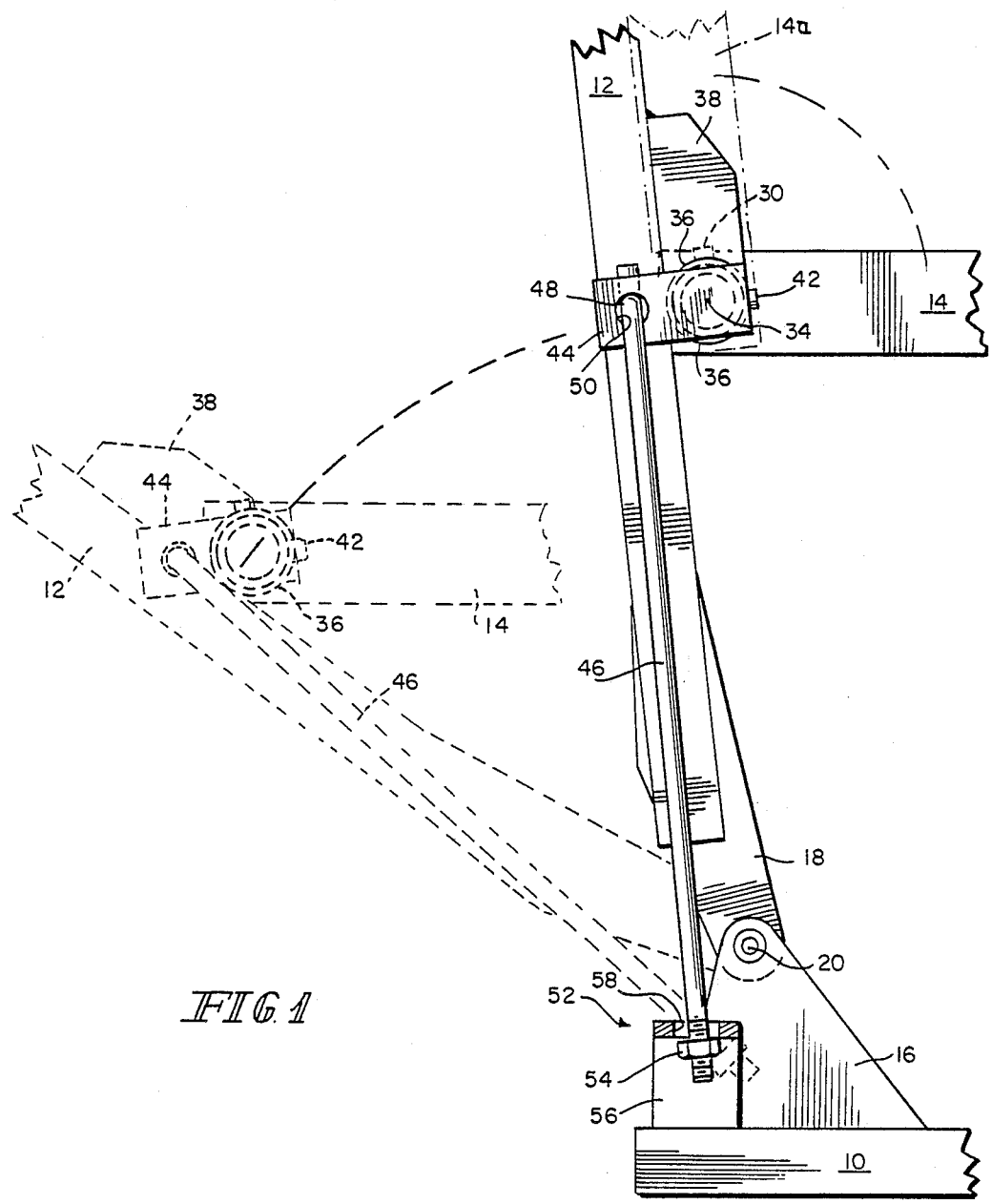
FIG. 1 is a schematic right side view of a left portion of a seat frame incorporating the present invention, showing relative component orientations in both upright and reclined positions.

FIG. 1, which illustrates a preferred embodiment of the present invention, shows a seat frame arrangement including seat bottom frame 10, seat back frame 12 and arm rest frame 14. Each of these frame elements is typically covered with foam, batting or other cushioning or padding material in a seat or chair. Attachment of such cushioning material may be accomplished by conventional methods. Similarly, to form finished seat back, seat bottom and arm rest members, this cushioning material is, for example, then covered by an upholstery material. As discussed below, according to the present invention the arm rest can be upholstered separately from the seat back and seat bottom and thereafter connected to the seat back. However, for simplicity of illustration, the drawings and discussion herein will generally omit reference to the cushioning and upholstery materials.

Seat bottom frame 10 is, for example, generally rectangular in shape with only the back or rear portion of that frame being shown in FIG. 1. Seat back frame 12 is also typically rectangular in shape and can include left and right tubular elements. Only the left tubular element is shown in the drawings, it being understood that the left and right tubular elements are typically spaced apart according to the desired width of the seat back and bridged by conventional connecting elements. These connecting elements have also been omitted from the drawings for simplicity of illustration.

As shown in FIG. 1, seat back frame 12 is pivotably connected to seat bottom frame 10. Specifically, flange 16 is fixedly mounted on seat bottom frame 10. Flange 18 is fixedly mounted on seat back frame 12. Flange 16 is pivotably connected to flange 18 by pivot pin 20. Conventional arrangements can be employed to control the pivotal movement of the seat back with respect to the seat bottom.

Arm frame 14 includes a connection sleeve 22 extending outwardly from the inner or occupant-adjacent side of the rear portion of that frame. Thus, sleeve 22 extends toward seat back frame 12 when the arm rest is connected to the side of seat back. Sleeve 22 is typically of sufficient length to extend beyond the finished arm rest when the arm frame is fully cushioned and upholstered so that the sleeve is insertable into the finished seat back.

Sleeve 22 is connected to the seat back through retainer 24. Sleeve 22 is preferably formed as a cylindrical tube which can be welded to arm frame 14. Sleeve 22 includes a circumferentially extending slot 26 which creates an opening through a portion of the sleeve. Retainer 24 preferably includes a mating member 28 which is insertable into sleeve 22 and rotatable therein. Mating member 28 includes locking pin 30 therein for securing sleeve 22 to mating member 28. When mating member 28 is fully received within sleeve 22, locking pin 30 is received within slot 26. Mating member 28 is preferably a cylindrical tube with a spring element 32 therein which biases locking pin 30 radially outward. When mating member 28 is inserted within sleeve 22, locking pin 30 is depressed radially inward against the biasing of spring element 32 so that the locking pin does not obstruct that insertion. Sleeve 22 and mating member 28 are, for example, longitudinally dimensioned so that when the mating member is fully inserted, locking pin 30 is able to be aligned with the opening of slot 26. When such alignment occurs, spring element 32 forces locking pin 30 radially outward and into slot 26. Similarly, sleeve 22 can be detached from retainer 24 by depressing locking pin 30 and then sliding sleeve 22 off of mating member 28.

In preferred embodiments, mating member 28 and sleeve 22 are connected together so as to be longitudinally coaxial along axis 34. Sleeve 22 is rotatable with respect to mating member 28 about axis 34. Locking pin 30 is slidable within slot 26, and, thus, this rotation of sleeve 22 is defined by the circumferential extent of slot 26 since locking pin 30 serves as a stop against further rotation at the ends of slot 26.

The arm rest is joined to the seat back only through sleeve 22. This cantilevered connection at the rear of arm frame 14 applies a constant rotational torque about axis 34 which biases the arm rest down toward the seat bottom. Thus, arm frame 14 and sleeve 22 are biased toward clockwise rotation, as viewed in FIG. 1. The amount of torque is a function of arm rest weight and can be supplemented during use by the occupant weight supported on the arm rest.

Figure 2:
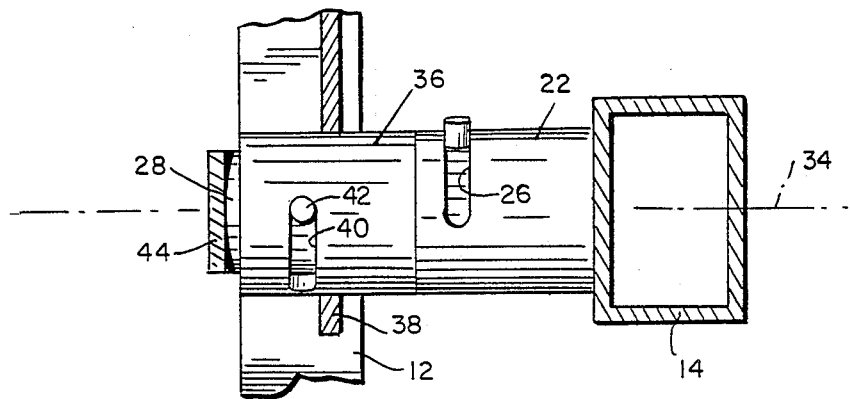
FIG. 2 is an enlarged, partial front view of the left arm rest mounting arrangement shown in FIG. 1 in an upright position.
Figure 3:
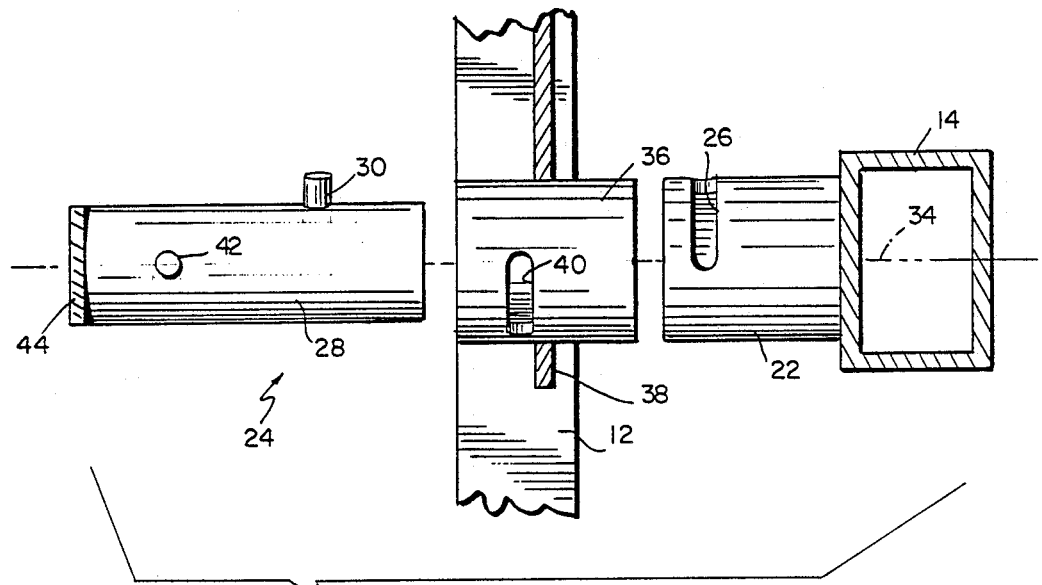
FIG. 3 is an exploded, partial front view of the left arm rest mounting arrangement shown in FIG. 2.

In the view of FIG. 2, downward rotation of sleeve 22 is prevented since locking pin 30 is at the upper end of slot 26. However, sleeve 22 can be freely rotated upward, with slot 26 sliding past locking pin 30 until the lower end of slot 26 abuts locking pin 30. In this manner, arm frame 14 and the finished arm rest can be lifted upward to provide greater accessibility to the seat. For example, where the present invention is incorporated in a vehicle driver's seat, the left arm rest can be lifted to a position substantially parallel with the seat back to provide access between the vehicle door and the seat for entering or leaving the vehicle. When the occupant is seated, the arm rest can be lowered back to the normal position or any other predetermined orientation maintained by locking pin 30. As shown in FIG. 1, the arm frame in the normal position is denoted as component 14; the arm frame in the increased access position is denoted as component 14a.

The rotation of sleeve 22 relative to mating member 28 is independent of the position of seat back frame 12 relative to seat bottom frame 10. To accomplish this, locating sleeve 36 is fixedly mounted to seat back frame 12. Sleeve 36 is, for example, supported on frame 12 by flange 38 and formed as a cylindrical tube. Sleeve 36 includes a circumferentially extending slot 40 which creates an opening through a portion of the sleeve. Mating member 28 is insertable into sleeve 36 and rotatable therein.

Mating member 28 includes another locking pin 42 for securing mating member 28 to sleeve 36. Locking pin 42 is also biased radially outward, preferably by spring element 32. When mating member 28 is inserted within sleeve 36, locking pins 30 and 42 are depressed radially inward so that neither locking pin obstructs that insertion. When mating member 28 is fully inserted within sleeve 36 locking pin 42 is aligned with the opening of slot 40 and spring element 32 can force locking pin 42 radially outward and into slot 40.

In preferred embodiments sleeves 22 and 36 are connected in a compact, longitudinally stacked orientation about mating member 28 so that all three components are coaxial along axis 34. Mating member 28 is rotatable with respect to sleeve 36 about axis 34. Locking pin 42 is slidable within slot 40, and, thus, this rotation of mating member 28 is defined by the circumferential extent of slot 40 since locking pin 42 serves as a stop against further rotation at the ends of slot 40.

Retainer 24 includes flange 44 which is fixed to a portion of mating member 28 which is not insertable into sleeve 22 or sleeve 36. As shown in FIG. 1, flange 44 extends rearward from mating member 28. Connection linkage 46 is pivotably attached to flange 44 at this rearward extension. Preferably, linkage 46 is formed by a rigid, elongated rod with a bent end 48 extending through a corresponding passageway 50 in flange 44. Linkage 46 is connected to seat bottom frame 10 through linkage mounting 52.

In preferred embodiments where linkage 46 is a rigid, elongated rod, one end of that rod is movably received in linkage mounting 52. That end of the rod is, for example, threaded and an adjustment nut 54 is mounted thereon so as to create an enlarged portion on the rod. Linkage mounting 52 includes a bracket 56 fixed to seat bottom frame 10. Bracket 56 includes a slot or opening 58 into which linkage rod 46 is inserted. The dimensions of slot 58 are such that, when nut 54 is mounted onto the rod, nut 54 cannot pass upward through slot 58. At the same time, however, portions of the rod which are not enlarged by nut 54 are freely movable within slot 58. Although not shown in the drawings, in preferred embodiments the edges and/or sides of slot 58 can be rounded or extruded to facilitate movement of the rod.

As seen from FIG. 1, when arm frame 14 is lowered to the normal position and locking pin 30 is abutting the upper end of slot 26 to prevent further downward rotation of arm frame 14, the arm rest applies rotational torque through mating member 28 to urge flange 44 to rotate upwardly about axis 34. Thus, flange 44 tends to urge linkage 46 upward and out of linkage mounting 52. The enlargement caused by nut 54 limits that movement and, thus, rotation of flange 44. Threading nut 54 to various desired positions along the rod permits selective shortening or lengthening of linkage 46.

As the length of linkage 46 between linkage mounting 52 and flange 44 changes, the rotational position of mating member 28 about axis 34 changes. For example, if the length of linkage 46 increases, flange 44 rotates upwardly and clockwise about axis 34, as viewed in FIG. 1. Such clockwise rotation of mating member 28 causes locking pin 30 to move downward from the position shown in in FIG. 2. Because of the biasing torque on sleeve 22, slot 30 will also move downward with locking pin 30. As a result, arm frame 14 rotates downward about axis 34, as viewed in FIG. 1. In this manner, the normal position of the arm rest can be selectively adjusted by nut 54 to establish any desired or predetermined orientation.

When seat back frame 12 is pivoted to any desired inclined position (reclined with respect to the seat bottom) about pivot pin 20, retainer 24 automatically maintains that predetermined arm rest orientation. In moving the seat back to the inclined position shown in FIG. 1, linkage 46 is also inclined and, because linkage mounting 52 is below and rearward of pivot pin 20, this inclination of the seat back causes the distance between passageway 50 and linkage mounting 52 to decrease. The excess length of linkage 46 slides into linkage mounting 52 with the point of engagement of the enlargement caused by nut 54 and linkage mounting 52 moving forward. This point of engagement is typically the focal point of restriction against upward movement of flange 44. Thus, when seat back inclination permits mating member 28 to rotate relative to sleeve 36, the predetermined orientation of arm frame 14 (and the arm rest formed thereby) has not been changed.

Preferably, the predetermined orientation of the arm rest is generally parallel with the seat bottom. To cause the left and right arm rests to be simultaneously adjusted as the seat back is reclined, two independent retainers can be employed, one on each side of the seat back frame. Since automatic positioning of the arm rest is controlled by seat back orientation, left and right arm rests and their respective mounting arrangement can function independently. Alternatively, a corresponding leftward extension can be provided on retainer 24, as viewed in FIG. 2, to simultaneously adjust both left and right arm rests by a single mounting arrangement. Such an extension may, for example, a cylindrical tube extending from flange 44 and including a locking pin corresponding to locking pin 30.

Because of the relative compactness permitted by the present invention, the entire mounting arrangement can be enclosed within the seat back and seat bottom without increasing their finished dimension. Since sleeve 22 can be readily connected or or detached from retainer 24 by depressing locking pin 30, the arm rest can be completely cushioned and upholstered separately from the seat back and seat bottom. In such separate upholstering sleeve 22 is left uncovered and a passageway from the side of the seat back into retainer 24 is provided so that sleeve 22 may be subsequently slid into place on retainer 24 within the seat back.

Thus, the present invention avoids many of the deficiencies found in prior devices without significant loss of durability or reliability. The present arrangement also simplifies construction and assembly while achieving the operational goals of automatic adjustment and increased seat accessibility.

Although the present invention has been described in detail, the same is by way of illustration and example only and is not to be taken by way of limitation. The spirit and scope of the present invention are to be limited only by the terms of the appended claims.

What is claimed is:
1. A vehicle seat arrangement, comprising:
   a seat bottom;

a seat back pivotably connected to said seat bottom at a first point;

at least a first arm member pivotably mounted to said seat back at a second point;

a linkage member connected at a first end to said first arm member at a third point;

said linkage member slideably connected at a second end to said seat bottom at a fourth point; and wherein said fourth point is located rearward of said first point.

2. The vehicle seat arrangement according to claim 1 further including means for detachably connecting said first arm member to said seat back.

3. The vehicle seat arrangement according to claim 1 further including a second arm member connected to said seat back oppositely from said first arm member, and said first means including alignment means for maintaining said second arm member in the same predetermined orientation as said first arm member when said seat back is pivoted with respect to said seat bottom.

4. The vehicle seat arrangement of claim 1, further comprising:

a locating sleeve fixed to said seat back;

a retaining member received within said locating sleeve and rotatable with respect to said locating sleeve;

said first arm member having a connection sleeve extending therefrom; and said connection sleeve being joined to said retaining member and rotatable with respect to said retaining member.

5. The vehicle seat arrangement according to claim 4 further including a first means for maintaining a selected orientation of said first arm member as said seat back is pivoted with respect to said seat bottom.

6. The vehicle seat arrangement according to claim 5 wherein said selected orientation being that said first arm member is substantially parallel to said seat bottom.

7. The vehicle seat arrangement according to claim 6 further including a lift means connected to said first arm member for permitting upward rotation of said first arm member from said selected orientation to a substantially vertical position.

8. The vehicle seat arrangement according to claim 5 wherein said first means includes a flange extending from said retaining member, said linkage member is pivotally connected to said flange and a linkage mounting for retaining said linkage member to said seat bottom.

9. The vehicle seat arrangement according to claim 8 wherein said first arm member is disposed so as to normally transmit a rotational force to said retaining member, and said linkage member is disposed so as to normally oppose this rotational force and permit automatic rotation of said retaining member when said seat back is pivoted with respect to said seat bottom.

10. The vehicle seat arrangement according to claim 8 wherein said fourth point is disposed lower than said first point.

11. The vehicle seat arrangement according to claim 8 wherein said retaining member rotates in a predetermined direction with respect to said locating sleeve, said linkage member includes a stop element to restrict rotation of said retaining member in said predetermined direction, said stop element being movable within said linkage mounting during pivotal movement of said seat back with respect to said seat bottom so as to permit limited rotation of said retaining member with respect to said locating sleeve, said limited rotation serving to maintain said selected orientation.

12. The vehicle seat arrangement according to claim 11 further including connection elements for permitting said connection sleeve to be freely rotatable in a direction opposite said predetermined direction while said connection sleeve is joined to said retaining member.

13. The vehicle seat arrangement according to claim 12 wherein said connection elements include a circumferential slot in one of said connection sleeve and said retaining member and a radial projection on the other of said connection sleeve and said retaining member, said radial projection being disposed for insertion into and sliding movement within said slot.

14. The vehicle seat arrangement according to claim 13 wherein said retaining member is a cylindrical tube and is coaxially inserted within said connection sleeve and said locating sleeve.

* * * * *

UNITED STATES PATENT AND TRADEMARK OFFICE
CERTIFICATE OF CORRECTION

PATENT NO. : 4,968,095

DATED : November 6, 1990

INVENTOR(S) : Geroge A. Moyer

It is certified that error appears in the above-identified patent and that said Letters Patent is hereby corrected as shown below:

On the title page item [56], please insert:

| | | |
|---|---|---|
| U.S. Patent No. 332,237 | 12/1885 | Curtiss |
| U.S. Patent No. 4,441,756 | 04/1984 | Liou, et al. |
| U.S. Patent No. 3,806,192 | 04/1974 | Ohlrogge, et al. |
| U.S. Patent No. 2,273,667 | 02/1942 | Staudt |
| U.S. Patent No. 1,917,557 | 07/1933 | Steiger |
| U.S. Patent No. 3,439,889 | 04/1969 | Karlsen |
| U.S. Patent No. 4,311,338 | 01/1982 | Moorhouse |
| U.S. Patent No. 4,558,901 | 12/1985 | Yokoyama |
| U.S.S.R. Patent No. 737,263 | 12/1977 | |
| European Patent Application No. 61,967 | 10/1982 | |

Signed and Sealed this

Seventh Day of April, 1992

*Attest:*

HARRY F. MANBECK, JR.

*Attesting Officer*  *Commissioner of Patents and Trademarks*